United States Patent
Itagaki

(10) Patent No.: US 9,866,718 B1
(45) Date of Patent: Jan. 9, 2018

(54) LIGHT SOURCE UNIT, IMAGE PROCESSING APPARATUS, IMAGE PROCESSING SYSTEM AND IMAGE PROCESSING METHOD

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Kenji Itagaki, Mishima Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/256,998

(22) Filed: Sep. 6, 2016

(51) Int. Cl.
H04N 1/00 (2006.01)
H04N 1/028 (2006.01)

(52) U.S. Cl.
CPC ....... *H04N 1/02835* (2013.01); *H04N 1/0281* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 5,729,361 A * | 3/1998 | Suggs | ....................... | G01J 3/02 250/226 |
| 6,498,867 B1 * | 12/2002 | Potucek | ............. | H04N 1/00092 356/237.2 |
| 6,631,219 B2 * | 10/2003 | Yushiya | ................. | H04N 1/484 382/312 |
| 7,558,524 B2 * | 7/2009 | Ooshima | ............ | H04N 1/00681 358/449 |
| 8,331,643 B2 * | 12/2012 | Yacoubian | ............. | G07D 7/121 382/135 |
| 9,294,651 B2 | 3/2016 | Okada et al. | | |
| 2002/0131094 A1 * | 9/2002 | Koshimizu | ........ | H04N 1/00092 358/509 |
| 2010/0046045 A1 * | 2/2010 | Nagao | ................ | H04N 1/00846 358/474 |
| 2013/0265617 A1 * | 10/2013 | Murakami | ........... | G02B 6/0001 358/448 |
| 2014/0376064 A1 * | 12/2014 | Rosberg | ............. | G01B 11/2513 358/475 |
| 2015/0110382 A1 * | 4/2015 | Shimoda | ................ | G01N 21/86 382/135 |
| 2016/0337637 A1 * | 11/2016 | Hwang | ............. | H04N 13/0418 |

OTHER PUBLICATIONS

MSU, "Electromagnetic Spectrum" <https://www.pa.msu.edu/courses/2000fall/PHY232/lectures/emwaves/spectrum.html?> dated Jan. 2001.*

* cited by examiner

*Primary Examiner* — Ming Hon
(74) *Attorney, Agent, or Firm* — Amin, Turocy & Watson LLP; Gregory Turocy

(57) ABSTRACT

In accordance with an embodiment, a first light source configured to emit visible light; a second light source configured to emit invisible light; and a light guide section configured to reflect the light emitted by the first light source and the second light source in a longitudinal direction towards a direction of a reading area of an image.

19 Claims, 6 Drawing Sheets

LIGHT SOURCE UNIT, IMAGE PROCESSING APPARATUS, IMAGE PROCESSING SYSTEM AND IMAGE PROCESSING METHOD

FIELD

Embodiments described herein relate generally to a light source unit, an image processing apparatus, an image processing system and an image processing method.

BACKGROUND

Conventionally, there is an image reading device having both a function of reading an image with visible light and a function of reading an image with invisible light. It is necessary to include a function of emitting the visible light and a function of emitting the invisible light in such a device. Thus, there is a case in which the size of a light source unit becomes too large.

DETAILED DESCRIPTION

In accordance with an embodiment, a light source unit comprises a first light source, a second light source and a light guide. The first light source emits visible light. The second light source emits invisible light. The light guide reflects the light emitted by the first light source and the second light source towards a longitudinal direction to a direction of a reading area of an image.

In accordance with an embodiment, image processing method involving emitting visible light from a first light source; emitting invisible light from a second light source; and reflecting the light emitted by the first light source and the second light source in a longitudinal direction towards a direction of a reading area of an image.

Hereinafter, the light source unit, an image processing apparatus, an image processing system and an image processing method according to an embodiment is described with reference to accompanying drawings.

Figure 1:
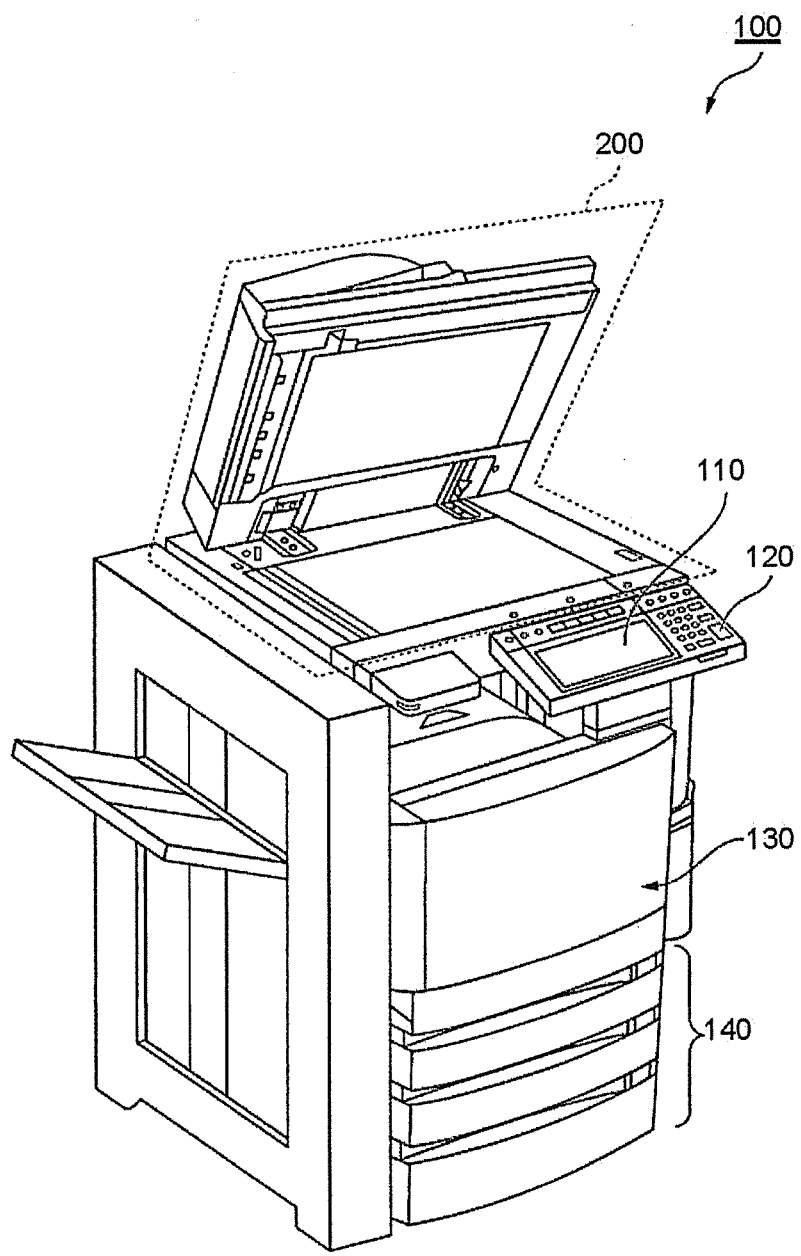
FIG. 1 is an external view illustrating an example of the whole configuration of an image processing apparatus 100 according to an embodiment.

FIG. 1 is an external view illustrating an example of the whole configuration of an image processing apparatus 100 according to the embodiment. The image processing apparatus 100 is, for example, a multifunction peripheral. The image processing apparatus 100 is equipped with a display 110, a control panel 120, a printer section 130, a sheet housing section 140 and an image reading section 200.

Further, the printer section 130 of the image processing apparatus 100 may be a device for fixing a toner image or an inkjet type device.

The image processing apparatus 100 forms an image on a sheet with a developing agent such as toner. The sheet is, for example, a paper or a label paper. The sheet may be an optional object as long as the image processing apparatus 100 can form an image on the surface thereof.

The display 110 is an image display device such as a liquid crystal display, an organic EL (Electro Luminescence) display and the like. The display 110 displays various information relating to the image processing apparatus 100.

The control panel 120 includes a plurality of buttons. The control panel 120 receives an operation of a user. The control panel 120 outputs a signal corresponding to the operation executed by the user to a control section of the image processing apparatus 100. Further, the display 110 and the control panel 120 may be integrally configured as a touch panel.

The printer section 130 forms an image on the sheet based on image information generated by the image reading section 200 or image information received via a communication path. The printer section 130 forms the image through the following processing. An image forming section of the printer section 130 forms an electrostatic latent image on a photoconductive drum based on the image information. The image forming section of the printer section 130 forms a visible image by attaching the develop agent to the electrostatic latent image. As a concrete example of the developing agent, the toner is exemplified. A transfer section of the printer section 130 transfers the visible image onto the sheet. A fixing section of the printer section 130 fixes the visible image on the sheet through heating and pressuring the sheet. Further, the sheet on which the image is formed may be a sheet housed in the sheet housing section 140 or a manually fed sheet.

The sheet housing section 140 houses the sheet used for the image formation in the printer section 130.

The image reading section 200 reads the image information serving as a reading object as the intensity of light. The image reading section 200 records the read image information. The recorded image information may be sent to another information processing apparatus via a network. The recorded image information may be used to form an image on the sheet by the printer section 130.

Figure 2:
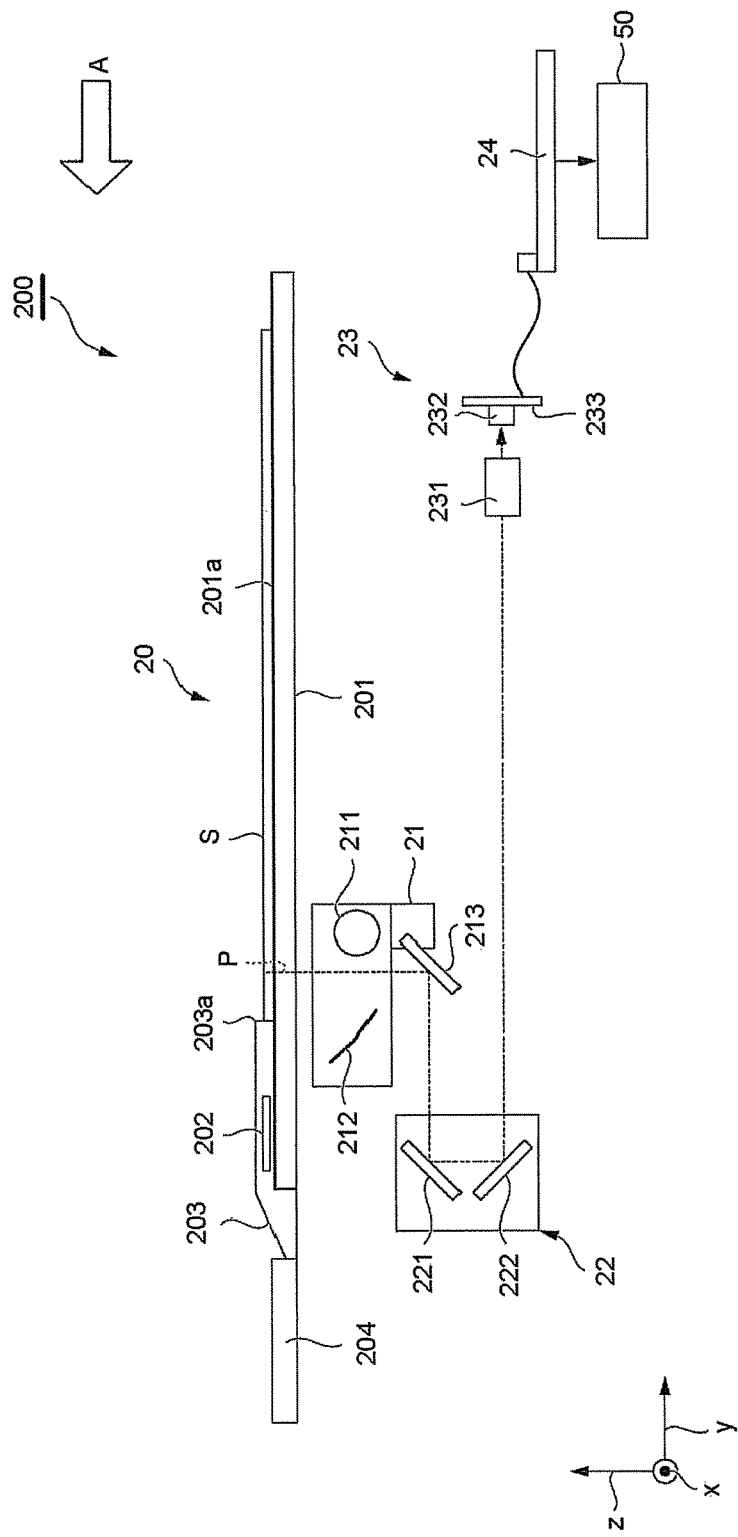
FIG. 2 is a schematic diagram illustrating an example of the configuration of an image reading section 200.

FIG. 2 is a schematic diagram illustrating an example of the configuration of the image reading section 200.

The image reading section 200 is equipped with a document table 20, a first carriage 21, a second carriage 22, an image capturing section 23, a control section 24 and an authenticity determination unit 50. The document table 20 may include an ADF (Automatic Document Feeder). A direction in which the first carriage 21 moves is a sub scanning direction y. In the document table 20, a direction orthogonal to the sub scanning direction y is a main scanning direction x. A direction orthogonal to both the main scanning direction x and the sub scanning direction y is a height direction z.

The document table 20 is equipped with a document table glass 201, a shading plate 202, a document scale 203 and a through lead glass 204.

The document table glass 201 is equipped with a placing surface 201a for placing a sheet S. The shading plate 202 is formed by a white member. The shading plate 202 has white color serving as a reference at the time of executing shading correction on an image (hereinafter, referred to as a "read image") read from the sheet S. The shading plate 202 has a long shape in the main scanning direction x. The document scale 203 shows a position of the sheet S placed on the document table glass 201. A front end reference section 203*a* is arranged at the end of the document scale 203. The front end reference section 203*a* forms a step with the placing surface 201*a* of the document table glass 201 to form a convex portion for pressing the end of the sheet S. The sheet S is pressed against the front end reference section 203*a* on the document table glass 201 to determine a position thereof. A position for placing a corner of a front end of the sheet S is determined in advance on the placing surface 201*a*. By placing the corner of the front end of the sheet S in a predetermined position, the positions of the main scanning direction x and the sub scanning direction y are determined.

The first carriage 21 is equipped with a light guide body 211, a reflector 212 and a first mirror 213. The light guide body 211 emits light. The reflector 212 reflects the light emitted from the light guide body 211. The light reflected by the reflector 212 is uniformly emitted to the shading plate 202 and the sheet S. Based on the reflected light of the emitted light, a light distribution characteristic of the main scanning direction x at the reading position of the sheet S is adjusted. The first mirror 213 reflects the light reflected by the shading plate 202 and the sheet S towards a second mirror 221 of the second carriage 22.

The second carriage 22 is equipped with the second mirror 221 and a third mirror 222. The second mirror 221 reflects the light reflected by the first mirror 213 towards the third mirror 222. The third mirror 222 reflects the light reflected by the second mirror 221 to a condensing lens 231 of the image capturing section 23.

The image capturing section 23 is equipped with a condensing lens 231, a CCD sensor 232 and a CCD substrate 233. The CCD sensor is an example of a "conversion section". The condensing lens 231 condenses the light reflected by the third mirror 222. The condensing lens 231 enables the condensed light to form an image on an image forming surface (reading surface) of the CCD sensor 232. The CCD sensor 232 is mounted on the CCD substrate 233. For example, the CCD sensor 232 is a hybrid 4-line sensor. The hybrid 4-line sensor includes a 3-line sensor for reading a color image and a 1-line sensor for reading a monochromatic image. The 3-line sensor reads R (red), G (green) and B (blue) light. The CCD sensor 232 converts the light imaged by the condensing lens 231 to the electric charge. Through the conversion, the CCD sensor 232 converts the image formed by the condensing lens 231 to an electrical signal. The CCD substrate 233 generates image data based on the electrical signal generated by photoelectric conversion of the CCD sensor 232. At the time of generating the image data, the CCD substrate 233 may use correction information obtained through a shading correction processing in advance to generate the image data. The CCD substrate 233 may output the generated image data to the control section 24. The foregoing processing executed by the CCD substrate 233 is executed by an AFE (Analog Front End) mounted on the CCD substrate 233.

Figure 3:
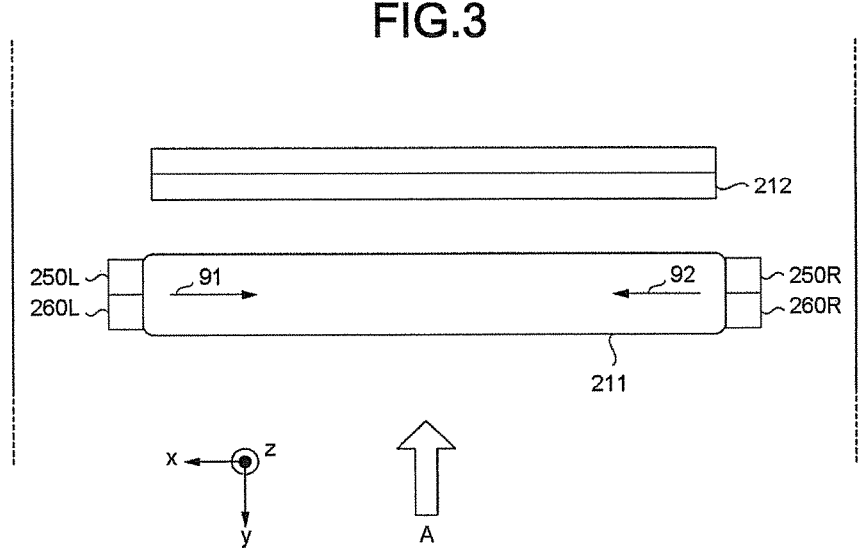
FIG. 3 is an enlarged view of the periphery of a light guide body 211 and a reflector 212.

FIG. 3 is an enlarged view of the periphery of the light guide body 211 and the reflector 212. An arrow A in FIG. 3 and an arrow A in FIG. 2 indicate the same direction.

A first light source 250R and a second light source 260R are installed at one end of the longitudinal direction (X direction) of the light guide body 211. A first light source 250L and a second light source 260L are installed at the other end of the longitudinal direction (X direction) of the light guide body 211. The first light source 250R faces the first light source 250L. The second light source 260R faces the second light source 260L. Hereinafter, in a case of not distinguishing between the first light source 250R and the first light source 250L, the first light source 250R and the first light source 250L are referred to as a first light source 250. Hereinafter, in a case of not distinguishing between the second light source 260R and the second light source 260L, the second light source 260R and the second light source 260L are referred to as a second light source 260.

Further, one of the first light source 250R and the first light source 250L may not be arranged. One of the second light source 260R and the second light source 260L may not be arranged. A plurality of the first light sources 250 or the second light sources 260 may be arranged at one end of the light guide body 211. The light guide body 211, the first light source 250 and the second light source 260 are examples of the light source unit.

The first light source 250 is a light emitting element (LED) that emits the visible light. The first light source 250 emits the visible light towards the inside and the longitudinal direction of the light guide body 211. In this way, the light guide body 211 emits the visible light to an area (reading position P) corresponding to one line of the main scanning direction x. The area corresponding to one line of the main scanning direction x is an example of a "segmentation line".

The second light source 260 is a light emitting element (LED) that emits the invisible light. The invisible light is, for example, an ultraviolet ray, an infrared ray, or an X-ray. In one embodiment, invisible light has a wavelength from 1 nm to 380 nm and/or 720 nm to 1 mm. The second light source 260 emits the invisible light towards the inside and the longitudinal direction of the light guide body 211. In this way, the light guide body 211 emits the invisible light to an area corresponding to one line of the main scanning direction x.

An arrow 91 and an arrow 92 shown in FIG. 3 indicate advancing directions of the visible light and the invisible light emitted by the first light source 250 and the second light source 260. In one embodiment, visible light has a wavelength from 400 nm to 700 nm. The first light source 250L and the second light source 260L respectively emit the visible light and the invisible light in a direction indicated by the arrow 91. The first light source 250R and the second light source 260R respectively emit the visible light and the invisible light in a direction indicated by the arrow 92.

Figure 4:
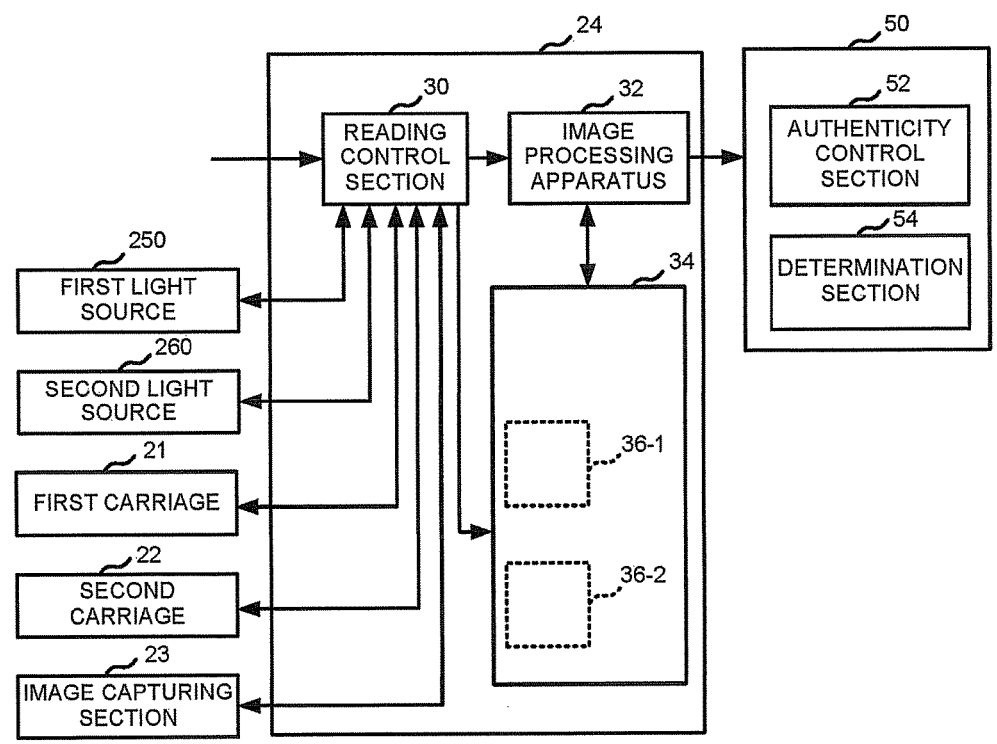
FIG. 4 is a diagram illustrating functional components of a control section 24.

FIG. 4 is a diagram illustrating functional components of the control section 24.

The control section 24 is equipped with a reading control section 30, an image processing section 32 and a storage section 34. One or both of the reading control section 30 and the image processing section 32 may be realized through the execution of a program by a processor such as a CPU (Central Processing Unit). A part or all of these functional sections may be realized through hardware such as an LSI (Large Scale Integration), an ASIC (Application Specific Integrated Circuit) or an FPGA (Field-Programmable Gate Array).

The storage section 34 is realized through, for example, a nonvolatile storage medium such as a ROM (Read Only Memory), a flash memory, an HDD (Hard Disk Drive) or an SD card and a volatile storage medium such as a RAM (Random Access Memory) or a register. In the present embodiment, the storage section 34 is described as the RAM.

The reading control section 30 controls the first carriage 21, the second carriage 22 and the image capturing section 23. For example, the reading control section 30 controls the move of the first carriage 21. The reading control section 30 executes control to turn on and turn off the first light source 250 and the second light source 260 in the first carriage 21. For example, the reading control section 30 controls operations of the image capturing section 23.

The first carriage 21 moves in the sub scanning direction y according to the control of the reading control section 30. The second carriage 22 moves in the same direction as the first carriage 21 along with the movement of the first carriage 21 at half the speed thereof. Through such an operation, even in a case in which the first carriage 21 moves, length of an optical path of the light reaching the image forming surface of the CCD sensor 232 does not change. In other words, the length of the optical path of the light in an optical system composed of the first mirror 213, the second mirror 221, the third mirror 222 and the condensing lens 231 is constant. In other words, the length of the optical path to the image forming surface of the CCD sensor 232 from the placing surface 201a is constant.

For example, in the example described above in FIG. 2, the first carriage 21 moves along the sub scanning direction y from left to right. Along with the movement of the first carriage 21 in the sub scanning direction y, the reading position P also moves with respect to the sheet S. Thus, the reading position P moves along the sub scanning direction y from left to right. The reading position P is a position corresponding to one lime of the main scanning direction x. Through the movement of the reading position P in the sub scanning direction y, images at the reading positions P of the sheet S are formed in order on the image forming surface of the CCD sensor 232. The CCD sensor 232 outputs a signal corresponding to the image at the imaged reading position P as a signal corresponding to one line of the main scanning direction x. From one end of the sheet S at the front end reference section 203a side to the other end thereof, the reading position P moves in the sub scanning direction y. The image reading section 200 acquires the information displayed on the reading position P corresponding to the sub scanning direction y every time the reading position P moves in the sub scanning direction y. The processing is one scanning. An area at which the image is read in one scanning is an example of a "reading area".

In the storage section 34, image buffers 36-1 and 36-2 are arranged. Hereinafter, in a case of not distinguishing between the image buffers 36-1 and 36-2, the image buffers 36-1 and 36-2 are referred to as an image buffer 36. The image buffer 36 is a memory area in which signals output from the CCD substrate 233 are accumulated.

Based on control timing information of the lighting and the extinction of the first light source 250 and the second light source 260, the reading control section 30 specifies the signal accumulated in the image buffer 36. For example, the reading control section 30 accumulates the signal acquired by irradiation of the visible light in the image buffer 36-1. The reading control section 30 accumulates the signal acquired by irradiation of the invisible light in the image buffer 36-2.

The image processing section 32 generates the image data of the whole sheet S based on the signal corresponding to one scanning accumulated in the image buffer 36.

The authenticity determination unit 50 is equipped with an authenticity control section 52 and a determination section 54. The authenticity control section 52 acquires the image data generated by the image processing section 32. Based on the acquired image data, the determination section 54 determines authenticity relating to the sheet S serving as a source of the image data.

For example, in a case in which predetermined information is contained in the image data acquired by enabling the second light source 260 to emit the invisible light, the determination section 54 determines that the target object (for example, the sheet S) the authenticity of which is determined is authentic. In this case, information is endowed by a predetermined developing agent to the authentication. The predetermined developing agent refers to a developing agent that develops color by the irradiation of the invisible light such as ultraviolet ray.

Figure 5:
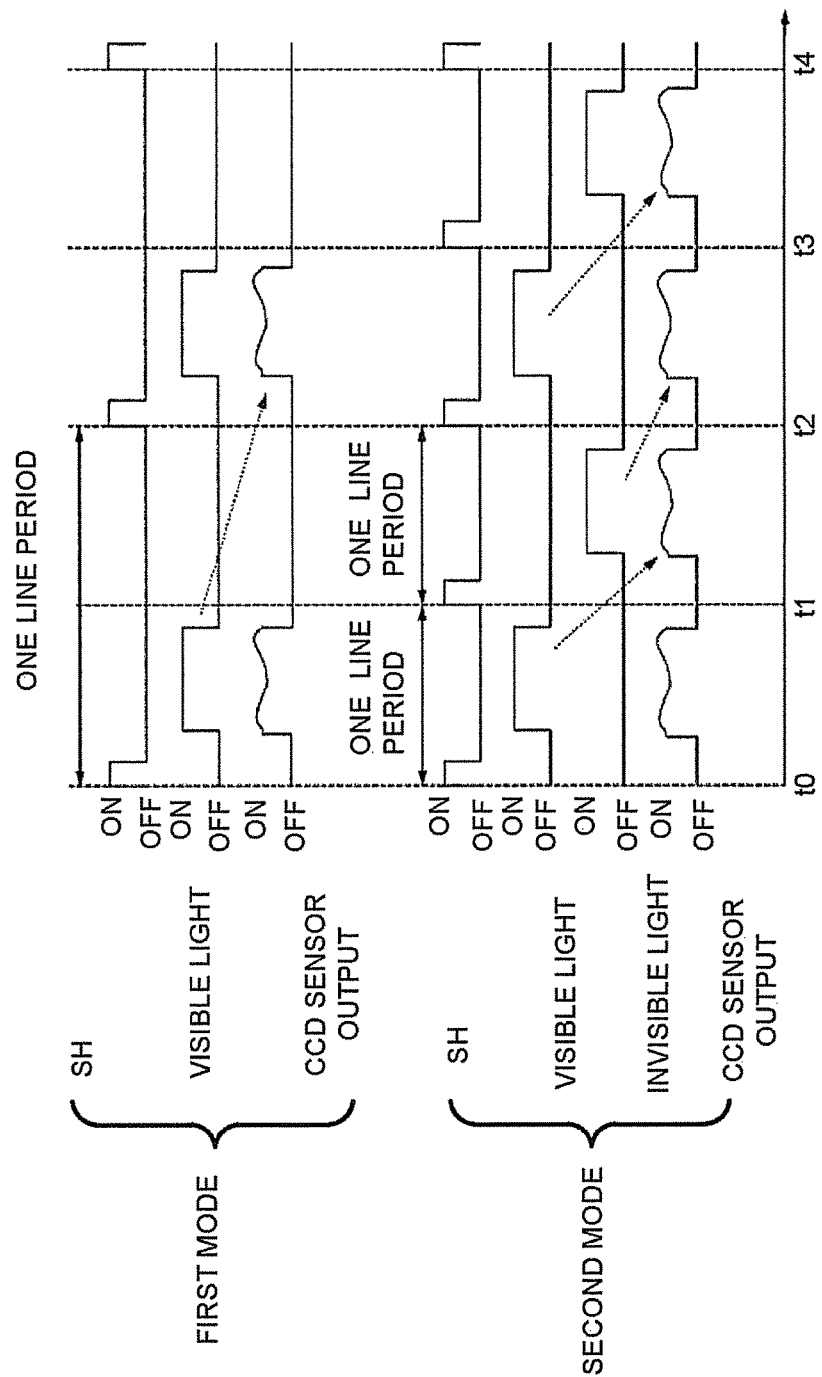
FIG. 5 is a timing chart illustrating operations of an image processing apparatus 100 according to a first embodiment.

FIG. 5 is a timing chart illustrating operations of the image processing apparatus 100 according to a first embodiment. FIG. 5 illustrates timing of operations of a first mode and a second mode. The first mode is a processing in which the first light source 250 emits the light and the second light source 260 does not emit light. The second mode is a processing in which both the first light source 250 and the second light source 260 emit light.

A timing chart of "SH" shown in FIG. 5 indicates the timing at which the CCD sensor 232 acquires a synchronization signal. A timing chart of "visible light" shown in FIG. 5 indicates the timing at which the first light source 250 emits the visible light. The timing chart of "invisible light" shown in FIG. 5 indicates the timing at which the second light source 260 emits the invisible light. A timing chart of "CCD sensor output" shown in FIG. 5 indicates the output of the electrical signal generated by the CCD sensor 232.

An interval from a point in time at which the CCD sensor 232 acquires the synchronization signal to a point in time of acquiring the next synchronization signal is a one Line period. The one Line period is an accumulation time (exposure time) for accumulating amount of light of the reflected light received by the CCD sensor 232 from an area corresponding to one line of the main scanning direction x. For example, the one Line period of the second mode is half the one Line period of the first mode.

In the first mode, the CCD sensor 232 and the reading control section 30 acquire the synchronization signal at a time to. In a period between the time t0 and a time t1, the reading control section 30 enables the first light source 250 to emit the light for a predetermined period of time. The CCD sensor 232 receives the reflected light with respect to the first light source 250. In a period between a time t2 and a time t3, the CCD sensor 232 outputs a signal corresponding to one line of the main scanning direction x in response to the reception of the reflected light. In the time t2, the first carriage 21 moves in the sub scanning direction y. Then, the above-mentioned operation is carried out. The image processing apparatus 100 repeats the operations described above until one scanning is terminated.

In the second mode, the CCD sensor 232 and the reading control section 30 acquire the synchronization signal at the time to. In a period between the time t0 and the time t1, the reading control section 30 enables the first light source 250 to emit the light for a predetermined period of time. The CCD sensor 232 receives the reflected light with respect to the first light source 250. In a period between the time t2 and the time t3, the CCD sensor 232 outputs a signal corresponding to one line of the main scanning direction x corresponding to the visible light in response to the reception of the reflected light.

Further, in the second mode, the CCD sensor 232 and the reading control section 30 acquire the synchronization signal at the time t1. In the second mode, in a period between the time t1 and the time t2, the reading control section 30 enables the second light source 260 to emit the light for a predetermined period of time. The CCD sensor 232 receives the reflected light with respect to the second light source 260. In a period between the time t2 and the time t3, the CCD sensor 232 outputs a signal corresponding to one line of the main scanning direction x corresponding to the invisible light in response to the reception of the reflected light. In this way, the signals corresponding to one line of the main scanning direction x corresponding to the visible light and the invisible light are output.

At the time t2, the first carriage 21 moves in the sub scanning direction y. Then, the above-mentioned operation is carried out. The image processing apparatus 100 repeats the operations described above until one scanning is terminated.

In this way, the image processing apparatus 100 can acquire the image data corresponding to the irradiation of the visible light and the invisible light in one scanning.

For example, the image processing section 32 generates the image data based on the signal output from the CCD sensor 232 to output the generated image data to the authenticity determination unit 50. In addition, the CCD sensor 232 may output an electrical signal corresponding to one scanning to the authenticity determination unit 50. In this case, the authenticity determination unit 50 determines authenticity of the object based on the electrical signal acquired from the CCD sensor 232.

Further, the reading control section 30 may enable the second light source 260 and the first light source 250 to emit light in order instead of enabling the first light source 250 and the second light source 260 to emit light in order.

Further, the interval of the one Line period in the first mode or the second mode may be set to any interval. The control section 24 may set the one Line period in such a manner that the one Line period of the first mode is equivalent to the one Line period of the second mode.

In the present embodiment, the first light source 250 and the second light source are installed at both ends of the light guide body 211. Therefore, there is a case in which each light source becomes small. In this case, the amount of the light output by the first light source 250 or the second light source 260 becomes less compared with a case in which the first light sources 250 are installed at the both ends of the light guide body 211. A processing for increasing the amount of the light output by the first light source 250 or the second light source 260 may be executed. For example, the reading control section 30 may make a current value applied to the first light source 250 or the second light source 260 to be greater than that applied to the first light source 250 in the first mode.

There is a case in which a PWM (Pulse Width Modulation) control is executed to the first light source 250 or the second light source 260. In this case, the reading control section 30 may make a duty ratio in the PWM control to be higher than that in the first mode. The reading control section 30 may make the irradiation time of the light by the first light source 250 or the second light source 260 to be higher than that of the light by a light source unit in which only the first light source is installed.

In the light source unit of the first embodiment described above, the first light source 250 and the second light source 260 are installed for one light guide section 211. The size of the light source unit is suppressed. The image processing apparatus 100 outputs signals of the reflected light with respect to the visible light and the invisible light in one line of the main scanning direction x. As a result, the image processing apparatus 100 can acquire the image information in the case where the sheet S is irradiated with the visible light and the invisible light in one scanning.

Second Embodiment

The interval of the one Line period in the first mode in the second embodiment is the same as that of the one Line period in the first mode in the first embodiment. Hereinafter, the description is executed centering on only the difference between the second embodiment and the first embodiment.

Figure 6:
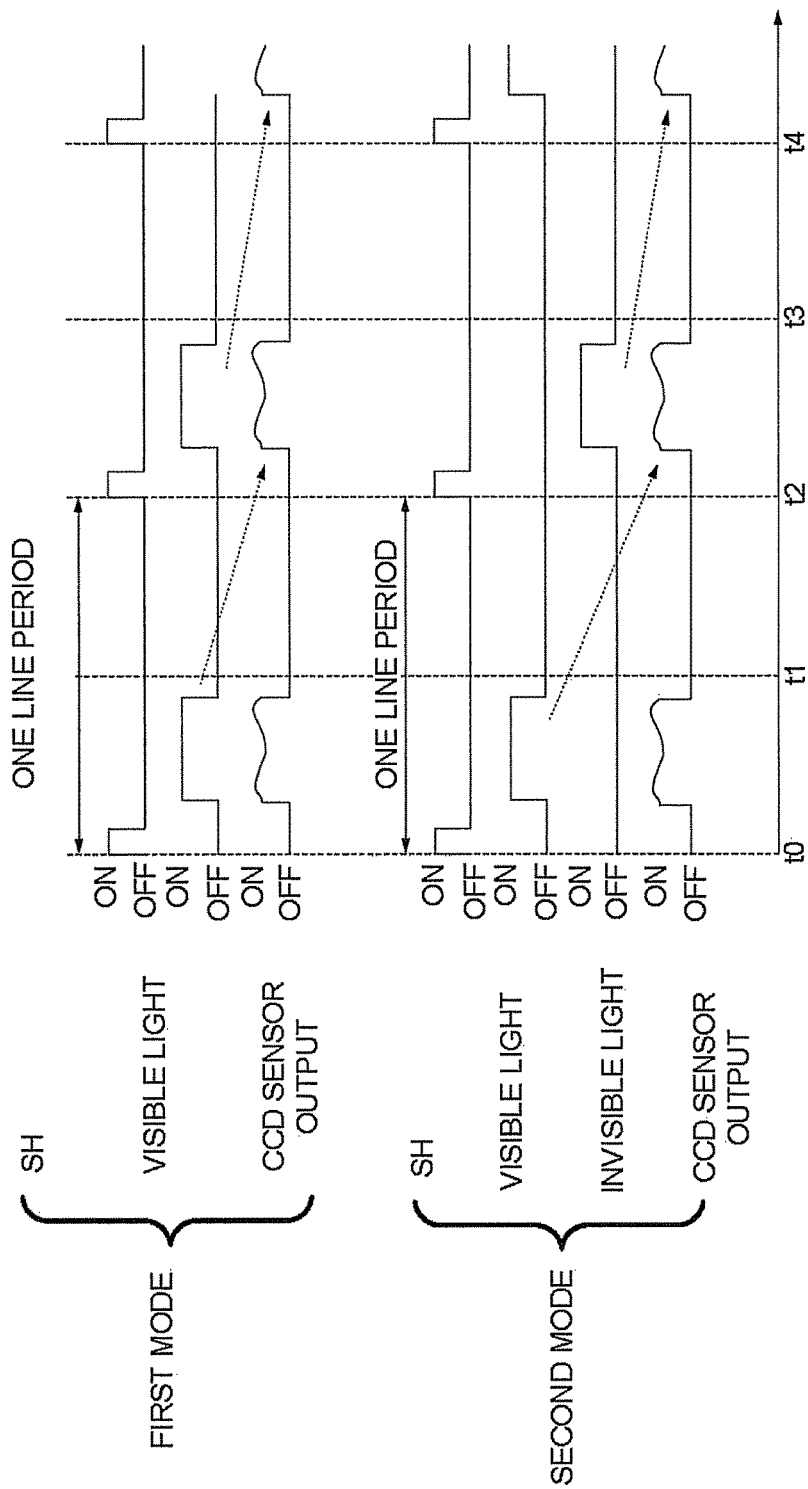
FIG. 6 is a timing chart illustrating operations of an image processing apparatus 100 according to a second embodiment.

FIG. 6 is a timing chart illustrating operations of an image processing apparatus 100 according to the second embodiment. For example, the one Line period of the first mode is the same as that of the second mode. The first mode of the second embodiment is the same as the first mode of the first embodiment.

In the second mode, the CCD sensor 232 and the reading control section 30 acquire the synchronization signal at the time t0. In a period between the time t0 and the time t1, the reading control section 30 enables the first light source 250 to emit the light for a predetermined period of time. The CCD sensor 232 receives the reflected light with respect to the first light source 250. In a period between the time t2 and the time t3, the CCD sensor 232 outputs a signal corresponding to one line of the main scanning direction x in response to the reception of the reflected light.

The CCD sensor 232 and the reading control section 30 acquire the synchronization signal at the time t2. In a period between the time t2 and the time t3, the reading control section 30 enables the second light source 260 to emit the light for a predetermined period of time. The CCD sensor 232 receives the reflected light with respect to the second light source 260. After the time t4 elapses, the CCD sensor 232 outputs a signal corresponding to one line of the main scanning direction x in response to the reception of the reflected light.

At the time t4, the first carriage 21 moves in the sub scanning direction y. Then, the above-mentioned operation is carried out. The image processing apparatus 100 repeats the operations described above until one scanning is terminated. As a result, the image processing apparatus 100 can acquire the image data corresponding to the irradiation of the visible light and the invisible light to the sheet S in one scanning.

In the second embodiment described above, the one Line period in the second mode is equivalent to the one Line period of the first mode. In this way, the CCD sensor 232 receives more amount of light and can output a larger output signal compared with the first embodiment.

Third Embodiment

In the first embodiment, the first light source 250R and the second light source 260R are installed at one end of the longitudinal direction (X direction) of the light guide body 211. On the contrary, in the third embodiment, the first light source 250 is installed at one end of the longitudinal direction of the light guide body 211. The second light source 260 is installed at the other end of the longitudinal direction of the light guide body 211.

Figure 7:
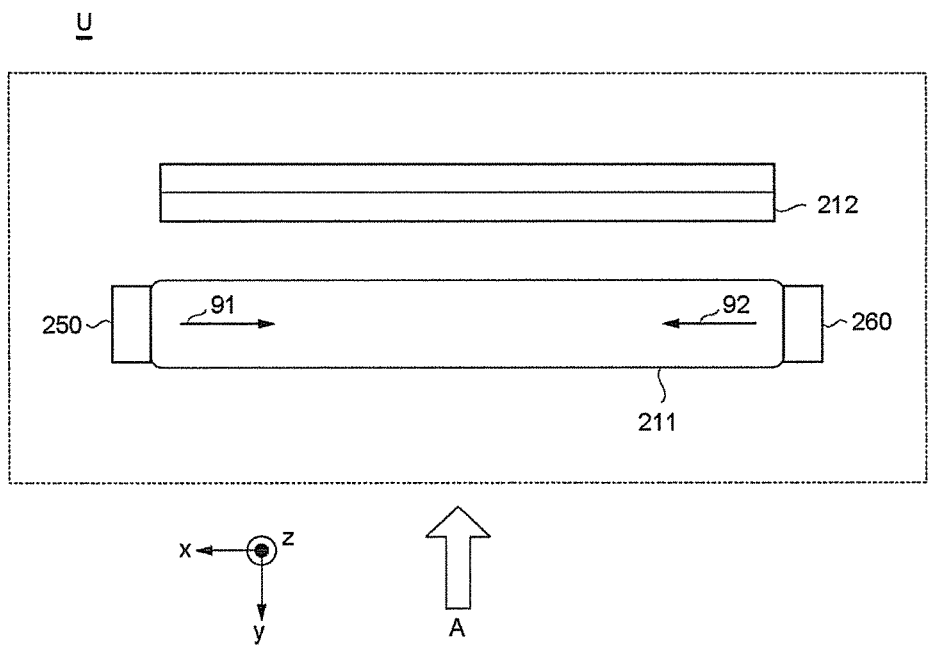
FIG. 7 is an enlarged view of the periphery of a light guide body 211 and a reflector 212 according to a third embodiment.

FIG. 7 is an enlarged view of the periphery of the light guide body 211 and the reflector 212 according to the third embodiment.

For example, the amount of the light emitted by the first light source 250 of the third embodiment is larger than that of the light emitted by the first light source 250 of the first embodiment. The amount of the light emitted by the second light source 260 of the third embodiment is larger than that of the light emitted by the second light source 260 of the first embodiment. In this way, similarly as the first embodiment, the light guide body 211 emits light sufficient to be received by the CCD sensor 232 towards the reading area of an image.

According to the third embodiment described, the first light source 250 is installed at one end of the longitudinal direction of the light guide body 211 and the second light source 260 is installed at the other end thereof. As a result, the configuration of the light source unit can be simplified.

According to at least one embodiment described above, with including the first light source that emits the visible light, the second light source that emits the invisible light and the light guide section configured to reflect the light emitted by the first light source and the second light source in the longitudinal direction towards the direction of the reading area of the image, the light source unit the size of which is suppressed can be supplied.

Other than in the operating examples, or where otherwise indicated, all numbers, values and/or expressions referring to conditions, etc., used in the specification and claims are to be understood as modified in all instances by the term "about."

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and there equivalents are intended to cover such forms or modifications as would fall within the scope and spirit of the invention.

What is claimed is:

1. A light source unit, comprising:
    a first light source configured to emit visible light;
    a second light source configured to emit invisible light; and
    a light guide configured to reflect the light alternately emitted by the first light source and the second light source based on an exposure time period in a longitudinal direction towards a direction of a reading area of an image.

2. The light source unit according to claim 1, wherein the first light source and the second light source are arranged at the both ends of the longitudinal direction of the light guide.

3. The light source unit according to claim 1, wherein the first light source is arranged at one end of the longitudinal direction of the light guide and the second light source is arranged at the other end of the longitudinal direction of the light guide.

4. An image processing apparatus, comprising:
    a light source unit comprising a first light source that emits visible light, a second light source that emits invisible light, and a light guide configured to reflect the light alternately emitted by the first light source and the second light source based on an exposure time period in a longitudinal direction towards a direction of a reading area of an image; and
    a CCD sensor configured to receive reflected light obtained by reflecting light emitted by the light source unit with a sheet to output the received result as an electrical signal.

5. The image processing apparatus according to claim 4, further comprising:
    an alternative irradiation controller configured to enable the first light source to emit visible light and the second light source to emit invisible light for each segmentation line formed by segmenting the reading area into a plurality of lines based on the exposure time period.

6. The image processing apparatus according to claim 5, wherein
    the alternative irradiation controller enables the first light source to emit the visible light at a first point in time and enables the second light source to emit the invisible light at a second point in time different from the first point in time to the segmentation line.

7. The image processing apparatus according to claim 6, wherein
    the alternative irradiation controller executes a first mode for enabling the first light source to emit the visible light to the segmentation line, and a second mode for enabling the first light source to emit the visible light and enabling the second light source to emit the invisible light to the segmentation line.

8. The image processing apparatus according to claim 7, wherein
    the first mode is a mode in which the first light source emits the visible light at a first period set in the first mode; and
    the second mode is a mode in which the first light source and the second light source alternatively emit light at a second period, shorter than the first period, which is set in the second mode.

9. The image processing apparatus according to claim 8, wherein,
    the first mode is a mode in which the CCD sensor receives the reflected light at the first period; and
    the second mode is a mode in which the CCD sensor receives the reflected light at the second period.

10. An image processing system, comprising:
    a light source unit comprising a first light source that emits visible light, a second light source that emits invisible light, and a light guide configured to reflect the light alternately emitted by the first light source and the second light source based on an exposure time period in a longitudinal direction towards a direction of a reading area of an image;
    a CCD sensor configured to receive reflected light obtained by reflecting light emitted by the light source unit with a sheet to output the received result as an electrical signal; and
    an authenticity determination unit configured to determine information contained to electrical signal acquired from the CCD sensor.

11. An image processing method, comprising:
    emitting visible light from a first light source;
    emitting invisible light from a second light source; and
    reflecting the light alternately emitted by the first light source and the second light source based on an exposure time period in a longitudinal direction towards a direction of a reading area of an image.

12. The image processing method according to claim 11, wherein the visible light and the invisible light are emitted from the both ends of the longitudinal direction.

13. The image processing method according to claim 11, wherein
    the visible light is emitted from one end of the longitudinal direction and the invisible light is emitted from the other end of the longitudinal direction.

14. The image processing method according to claim 11, further comprising:

receiving reflected light obtained by reflecting light emitted by the first and second light sources with a sheet and outputting a received result as an electrical signal.

15. The image processing method according to claim 14, further comprising:

emitting visible light and invisible light for each segmentation line formed by segmenting the reading area into a plurality of lines.

16. The image processing method according to claim 15, further comprising:

emitting the visible light at a first point in time and emitting the invisible light at a second point in time different from the first point in time to the segmentation line.

17. The image processing method according to claim 14, further comprising:

determining authenticity relating to the sheet based on the electrical signal output.

18. The image processing method according to claim 11, wherein the visible light has a wavelength from 400 nm to 700 nm.

19. The image processing method according to claim 11, wherein the invisible light has a wavelength from 1 nm to 380 nm or 720 nm to 1 mm.

* * * * *